Aug. 2, 1927.
R. JENSEN
1,637,379
RESILIENT GEARING
Filed Sept. 22. 1924   3 Sheets-Sheet 1.
Fig.1.
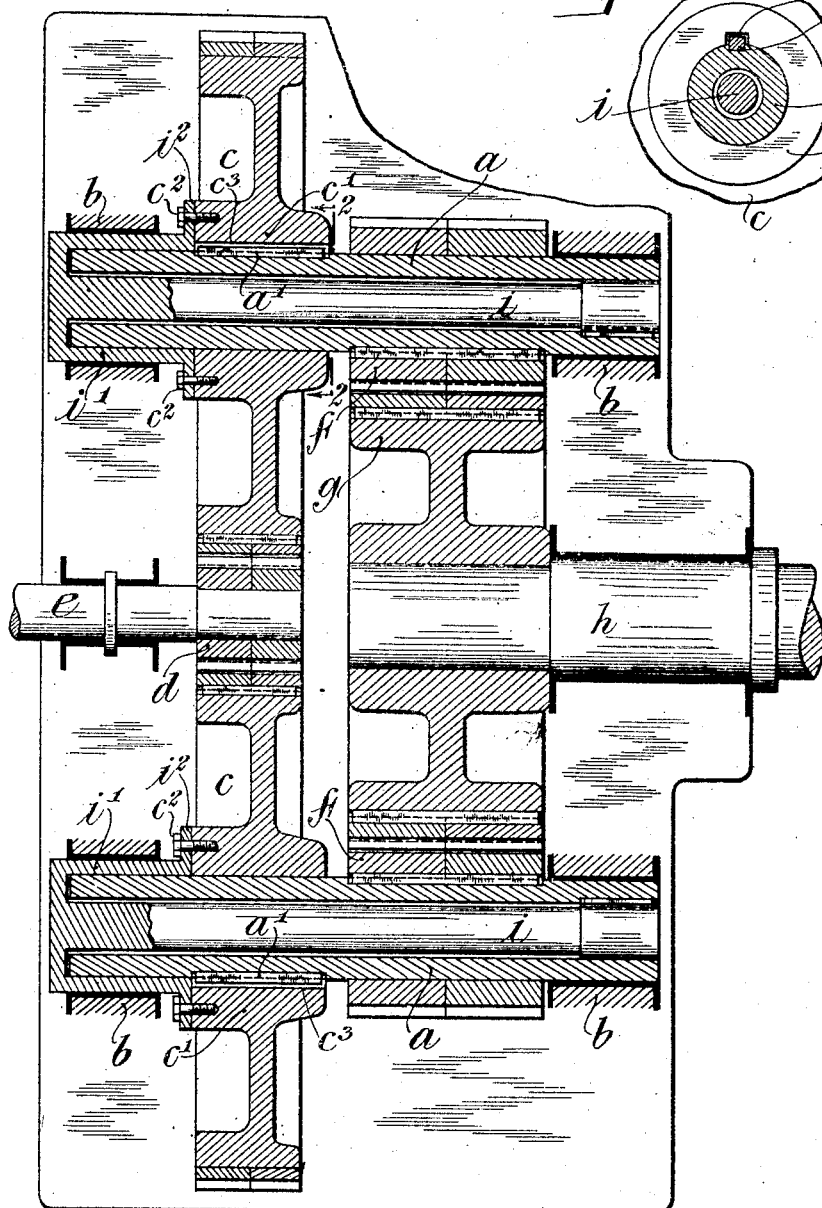
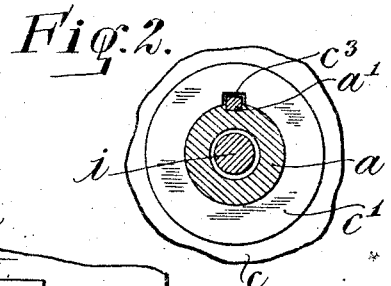
Fig.2.
Robert Jensen Inventor Aug. 2, 1927. 1,637,379
R. JENSEN
RESILIENT GEARING
Filed Sept. 22, 1924   3 Sheets-Sheet 2
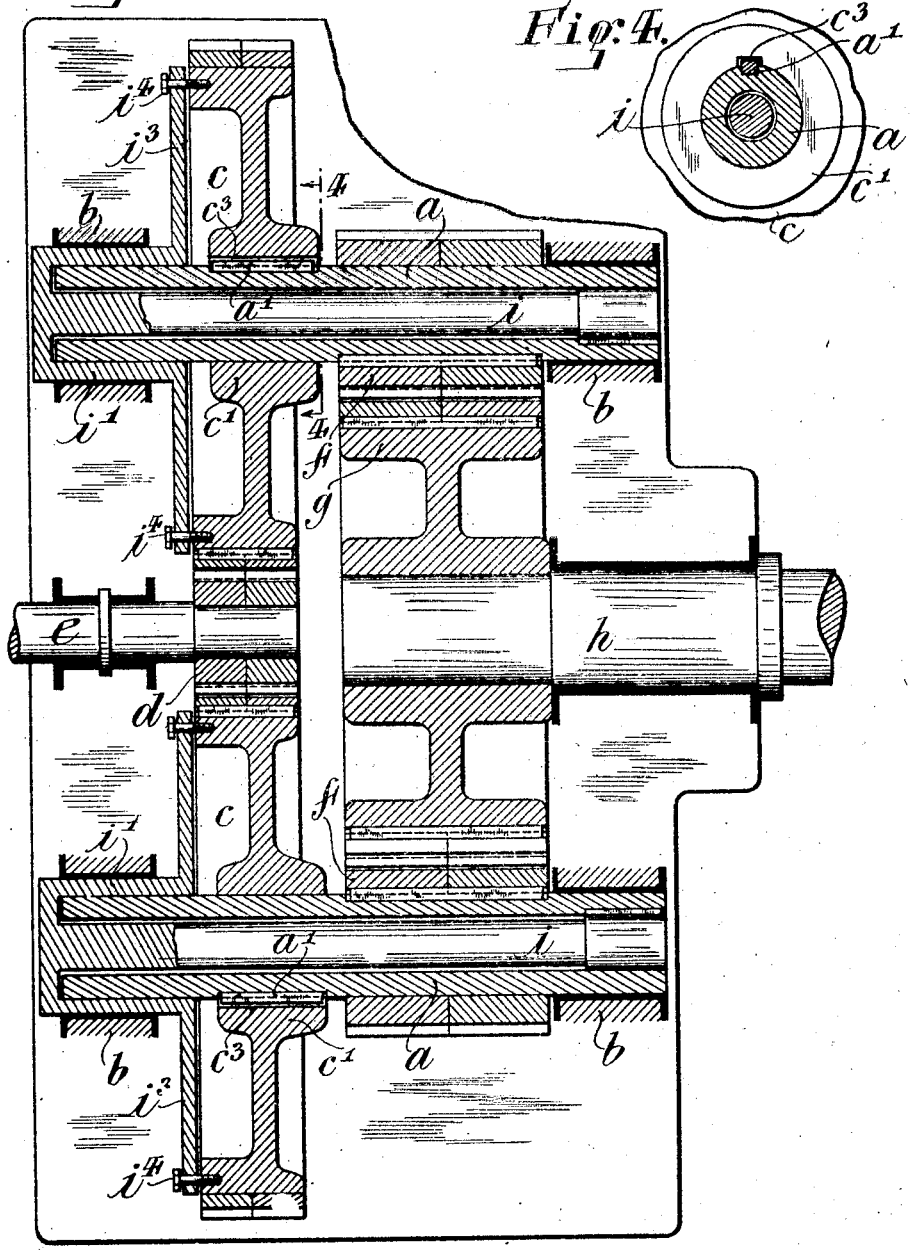
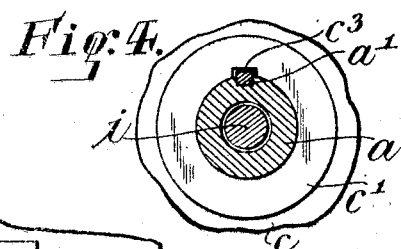
Inventor
Robert Jensen

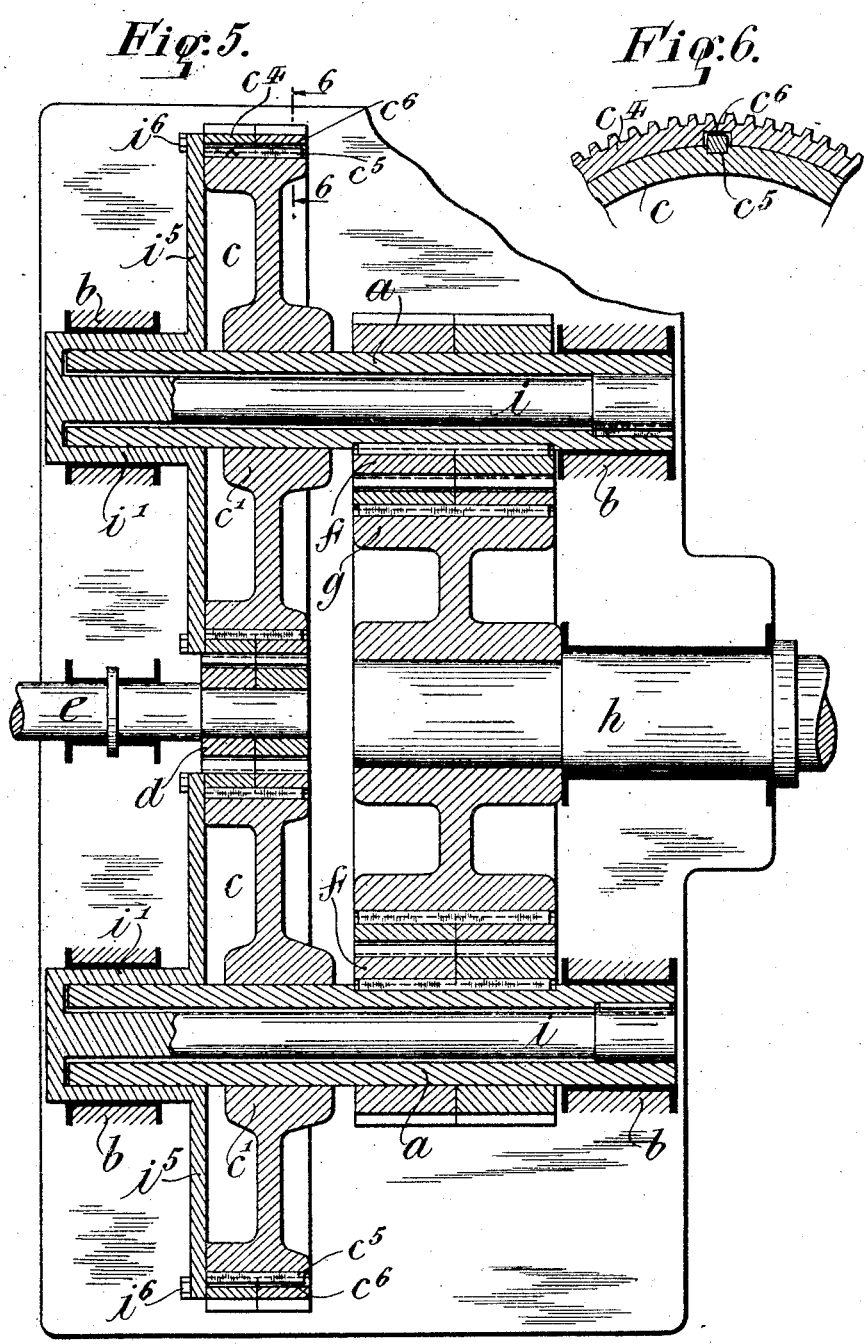

Patented Aug. 2, 1927.

1,637,379

UNITED STATES PATENT OFFICE.

ROBERT JENSEN, OF FREDERIKSBERG, NEAR COPENHAGEN, DENMARK, ASSIGNOR TO F. L. SMIDTH & CO., OF NEW YORK, N. Y., A CORPORATION OF NEW JERSEY.

RESILIENT GEARING.

Application filed September 22, 1924, Serial No. 738,974, and in Denmark September 29, 1923.

This invention has been developed with particular reference to its application to gearing in which several gears are driven from a single driving pinion. In such gearing, if the several gears are fixed rigidly on their respective shafts, it is impossible for the transmitted power to be evenly distributed because apparently insignificant and practically unavoidable faults of construction bring about such inequality of distribution of power that at times one gear may carry all the load. Various means have been devised heretofore for the purpose of securing such resilient action of the driven gear as will compensate for such faults of construction to the end that each gear shall be driven evenly. The present invention has for its object to provide improved means for establishing such resilient relation of the driven gear to the driving pinion, a further object being to provide also improved means whereby one of the co-operating gears shall be capable also of yielding in an axial direction for the purpose of securing proper alignment of the co-operating gears as is desirable with certain forms of gear teeth, such as double helical teeth. In accordance with the invention, the driven gear is coupled to its shaft through a longitudinal spring member or torsion shaft located within the bore of the hollow shaft and connected at one end to the shaft and at the other end to the gear which is loosely mounted on the shaft. Means are also provided to limit the rotary movement of the gear with respect to the shaft so as to prevent the placing of too great a load on the torsion member. Provision is also made to permit limited longitudinal movement, that is, movement in an axial direction, as between the gear and the shaft in order that the gear may properly align itself with the co-operating gear or pinion if the character of the teeth, such as double helical teeth, is such as to make such alignment desirable. It will be understood that although the invention, as stated above, has been developed with particular reference to the driving of a plurality of gears from a single driving pinion, it is applicable in any gearing in which it is desirable that there shall be a degree of resilience in the gearing and, as to the second part of the invention, to any gearing in which it is desirable, because of the character of the teeth, that the gearing shall be self-aligning. The invention will be explained more fully hereinafter with reference to the accompanying drawings in which several embodiments of the invention are illustrated and in which—

Figure 1 is a view partly in longitudinal section and partly in elevation of a gearing which embodies the invention, the connection between the torsion member and the gear being effected at the hub of the gear.

Figure 2 is a detail view in section on the plane indicated by the broken line 2—2 of Figure 1.

Figures 3 and 4 are views respectively similar to Figures 1 and 2, but with the connection between the torsion member and the gear at the outer portion of the gear body.

Figures 5 and 6 are views also similar respectively to Figures 1 and 2, but with the connection between the torsion member and the gear at the toothed portion of the gear.

In the several embodiments of the invention illustrated in the drawings, each tubular shaft $a$, supported in suitable bearings $b$, has mounted thereon with a working fit the driven gear $c$, the several gears $c$ being engaged by a driving pinion $d$ on the driving shaft $e$. In the several constructions shown each shaft $a$ has fixed thereon a pinion $f$ which meshes with a gear $g$ on the shaft $h$.

Within the bore of each hollow shaft $a$ is a longitudinal spring or torsion member or shaft $i$ which at one end is connected to the shaft $a$ to rotate therewith and at the other end is operatively connected to the gear $c$ to rotate the same.

In the construction shown in Figures 1 and 2 the torsion member $i$ is splined to the shaft $a$ so as to be capable of limited longitudinal movement, that is, in an axial direction, with respect to the shaft $a$ while rotating therewith. At its other end the torsion member $i$ is provided with a sleeve $i'$ which is interposed between the shaft $a$ and the bearing $b$ at that end and is secured to the hub $c'$ of the gear body $c$ by bolts $c^2$ which are passed through a flange $i^2$ of the sleeve $i'$ into the hub of the gear body.

The construction described, as will be obvious, permits, through the action of the torsion member, a rotary yielding of the gear $c$ with respect to its shaft $a$ and in order to limit such rotary yielding, so that too great a load shall not be imposed on the torsion member, the shaft $a$ is provided with a spline $a'$ which enters a larger slot $c^3$ in the hub of the gear $c$, so that torsion of the torsion member $i$ ceases when the spline $a'$ makes contact with one side or the other of the slot $c^3$. This form of connection between the shaft and the gear also permits relative movement of the gear in an axial direction, for a purpose hereinafter explained.

In the arrangement shown in Figures 3 and 4, the details of construction are the same as already described with respect to Figures 1 and 2, except as to the connection between the torsion member $i$ and the shaft $a$ at one end and between the torsion member $i$ and the gear $c$ at the other end. In this instance the torsion member may be keyed fast in the bore of the shaft $a$ at its right hand end so as to be incapable of relative movement in an axial direction. At the other end of the torsion member the sleeve $i'$, also interposed between the shaft $a$ and its bearing $b$, is provided with a larger flange $i^3$ which is connected near its periphery to the body of the wheel $c$ near its periphery by bolts $i^4$ which have smooth shanks where they pass through the flange and are long enough to permit relative longitudinal movement of the gear $c$ for the purpose to be described. In this instance, also, the shaft $a$ carries a spline $a'$ which engages a larger slot $c^3$ in the hub $c'$ of the gear $c$ for the purpose of limiting the relative rotary movement and protecting the torsion member $i$.

In the embodiment of the invention shown in Figures 5 and 6, the details of construction are substantially the same as already described with respect to Figures 1, 2, 3 and 4, with the torsion member $i$ splined to the shaft $a$ so as to be capable of movement in an axial direction, but the flange $i^5$ of the sleeve $i'$ is extended further so that the bolts $i^6$ shall enter directly the toothed rim $c^4$ of the gear $c$, such rim being mounted loosely on the body of the gear while a spline $c^5$ fixed in the body of the gear enters a larger slot $c^6$ in a toothed rim $c^4$ for the purpose of limiting relative rotary movement of the toothed rim and body of the gear.

In the several embodiments of the invention illustrated in the drawings, all gears and pinions are shown as provided with teeth which are skewed or not parallel to the axis, the particular form shown being that of double helical teeth. It is well understood that the symmetric planes (at right angles to the shafts) of two such gears in engagement with each other should coincide as otherwise the two halves of the gears are not equally loaded and axial pressure in one direction or the other is developed. It is found that if one of such gears is relatively movable in an axial direction to a limited extent, such a pair of gears will be self-aligning and accordingly there is provided, in each of the several embodiments of the invention illustrated, a connection between the shaft and the gear $c$ which transmits power rotarily but permits the movement of the gear $c$ in an axial direction. In the construction shown in Figures 1 and 5, for example, the torsion member $i$ is splined to the shaft $a$ so as to be capable of relative movement in an axial direction, the gears $c$ moving with it, while in Figure 3 the elongated bolts which pass through the flange $i^3$ into the gear $c$ permit the desired relative movement of the gear $c$.

Various other embodiments of the several features of the invention will readily suggest themselves and the invention, therefore, except as pointed out in the claims, is not restricted to any particular embodiment shown and described herein.

I claim as my invention:

1. Gearing comprising a driving pinion, a plurality of gears in engagement with said pinion, a plurality of hollow shafts on which said gears are respectively mounted, and a plurality of torsion members within the shafts respectively and operatively connected at one end with the shaft and at the other end with the gear.

2. Gearing comprising a driving pinion, a plurality of gears in engagement with said pinion, a plurality of hollow shafts on which said gears are respectively mounted, a plurality of torsion members within the shafts respectively and operatively connected at one end with the shaft and at the other end with the gear with provision for relative movement in an axial direction as between said pinion and said gears.

3. Gearing comprising a hollow shaft, a gear rotarily mounted on the shaft, a torsion member connected at one end to the shaft and at the other end to the gear with provision for relative movement of the gear in an axial direction, and a second gear co-acting with the first, both of said gears being formed with double skewed teeth.

This specification signed this 30th day of August, A. D. 1924.

ROBERT JENSEN.